(12) United States Patent
Seo et al.

(10) Patent No.: US 8,005,346 B2
(45) Date of Patent: Aug. 23, 2011

(54) RECORDING MEDIUM HAVING DATA STRUCTURE FOR MANAGING REPRODUCTION OF DATA RECORDED THEREON AND RECORDING AND REPRODUCING METHODS AND APPARATUSES

(75) Inventors: Kang Soo Seo, Kyunggi-do (KR); Chang Bum Kim, Seoul (KR); Tae Ho Kim, Seoul (KR); Byung Jin Kim, Kyunggi-do (KR); Soung Hyun Um, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 985 days.

(21) Appl. No.: 10/716,629

(22) Filed: Nov. 20, 2003

(65) Prior Publication Data

US 2004/0105661 A1 Jun. 3, 2004

(30) Foreign Application Priority Data

Nov. 20, 2002 (KR) ........................ 10-2002-0072519

(51) Int. Cl.
*H04N 5/84* (2006.01)
*H04N 5/89* (2006.01)
*H04N 5/92* (2006.01)
*H04N 5/80* (2006.01)

(52) U.S. Cl. ........ 386/333; 386/336; 386/335; 386/337; 386/248

(58) Field of Classification Search ............... 386/95, 386/125–126, 336, 335, 337, 248, 333
See application file for complete search history.

(56) References Cited

U.S. PATENT DOCUMENTS

| 4,164,760 | A | * | 8/1979 | Inaba et al. ................. 348/22 |
| 5,854,873 | A | | 12/1998 | Mori et al. |
| 5,870,523 | A | | 2/1999 | Kikuchi et al. |
| 5,884,004 | A | | 3/1999 | Sato et al. |
| 5,907,658 | A | | 5/1999 | Murase et al. |
| 5,999,698 | A | | 12/1999 | Nakai et al. |
| 6,064,379 | A | * | 5/2000 | DeMoney ................. 715/203 |
| 6,122,436 | A | | 9/2000 | Okada et al. |
| 6,148,138 | A | | 11/2000 | Sawabe et al. |
| 6,157,769 | A | | 12/2000 | Yoshimura et al. |
| 6,250,928 | B1 | | 6/2001 | Poggio et al. |
| 6,266,483 | B1 | | 7/2001 | Okada et al. |

(Continued)

FOREIGN PATENT DOCUMENTS

AU 6672298 9/1998

(Continued)

OTHER PUBLICATIONS

U.S. Appl. No. 10/716,211, filed Dec. 2, 2004, Berry.

(Continued)

*Primary Examiner* — Helen Shibru
(74) *Attorney, Agent, or Firm* — Harness, Dickey & Pierce, P.L.C.

(57) ABSTRACT

The recording medium includes a data structure having at least first and second clip stream files and a playlist. The first clip stream file includes video data representing at least one still image, and the second clip stream file includes at least audio data. The playlist includes at least one playitem and at least one sub-playitem. The playitem indicates at least a portion of the first clip stream file to reproduce, and the sub-playitem indicates at least a portion of the second clip stream file to reproduce.

29 Claims, 8 Drawing Sheets

U.S. PATENT DOCUMENTS

| | | |
|---|---|---|
| 6,285,826 B1 | 9/2001 | Murase et al. |
| 6,308,005 B1 | 10/2001 | Ando et al. |
| 6,341,196 B1 | 1/2002 | Ando et al. |
| 6,353,702 B1 | 3/2002 | Ando et al. |
| 6,369,835 B1 | 4/2002 | Lin |
| 6,374,037 B1 | 4/2002 | Okada et al. |
| 6,385,389 B1 | 5/2002 | Maruyama et al. |
| 6,393,430 B1 | 5/2002 | Van Ryzin |
| 6,400,893 B1 | 6/2002 | Murase et al. |
| 6,424,797 B1 | 7/2002 | Murase et al. |
| 6,442,337 B1 | 8/2002 | Okada et al. |
| 6,470,460 B1 | 10/2002 | Kashiwagi et al. |
| 6,493,504 B1 | 12/2002 | Date et al. |
| 6,529,683 B2 | 3/2003 | Mori et al. |
| 6,532,335 B2 | 3/2003 | Otomo et al. |
| 6,574,419 B1 | 6/2003 | Nonomura et al. |
| 6,580,870 B1 | 6/2003 | Kanazawa et al. |
| 6,594,442 B1 | 7/2003 | Kageyama et al. |
| 6,748,415 B1* | 6/2004 | Sugimoto ............ 709/201 |
| 6,771,891 B1 | 8/2004 | Moon |
| 6,798,976 B2 | 9/2004 | Tsumagari et al. |
| 6,816,189 B2 | 11/2004 | Nagaoka et al. |
| 6,823,010 B1 | 11/2004 | Curet et al. |
| 6,829,211 B2 | 12/2004 | Sake et al. |
| 6,856,756 B1 | 2/2005 | Mochizuki et al. |
| 6,919,925 B2 | 7/2005 | Kudo |
| 6,975,363 B1 | 12/2005 | Baldwin et al. |
| 6,992,710 B2 | 1/2006 | Nagaoka |
| 6,999,674 B1 | 2/2006 | Hamada et al. |
| 7,054,545 B2 | 5/2006 | Ando et al. |
| 7,158,175 B2 | 1/2007 | Belz et al. |
| 7,224,890 B2 | 5/2007 | Kato |
| 7,343,052 B2 | 3/2008 | Roth et al. |
| 2001/0000809 A1 | 5/2001 | Ando et al. |
| 2001/0016112 A1 | 8/2001 | Heo et al. |
| 2001/0043790 A1* | 11/2001 | Saeki et al. ............ 386/65 |
| 2001/0046371 A1 | 11/2001 | Ando et al. |
| 2001/0056580 A1 | 12/2001 | Seo et al. |
| 2002/0025143 A1 | 2/2002 | Kashiwagi et al. |
| 2002/0035575 A1 | 3/2002 | Taira et al. |
| 2002/0048228 A1 | 4/2002 | Sako et al. |
| 2002/0085022 A1 | 7/2002 | Masuda et al. |
| 2002/0110369 A1 | 8/2002 | Mori et al. |
| 2002/0126994 A1 | 9/2002 | Gunji et al. |
| 2002/0127001 A1 | 9/2002 | Gunji et al. |
| 2002/0130896 A1 | 9/2002 | Spence et al. |
| 2002/0135607 A1 | 9/2002 | Kato et al. |
| 2002/0135608 A1* | 9/2002 | Hamada et al. ............ 345/723 |
| 2002/0145702 A1* | 10/2002 | Kato et al. ............ 352/1 |
| 2002/0164152 A1 | 11/2002 | Kato et al. |
| 2002/0172496 A1 | 11/2002 | Gunji et al. |
| 2002/0176695 A1* | 11/2002 | Sawabe et al. ............ 386/95 |
| 2003/0014760 A1 | 1/2003 | Yamauchi et al. |
| 2003/0138238 A1 | 7/2003 | Kashiwagi et al. |
| 2003/0165328 A1 | 9/2003 | Grecia |
| 2003/0235406 A1 | 12/2003 | Seo et al. |
| 2004/0001704 A1 | 1/2004 | Chan et al. |
| 2004/0047607 A1 | 3/2004 | Seo et al. |
| 2004/0057700 A1* | 3/2004 | Okada et al. ............ 386/95 |
| 2004/0081434 A1* | 4/2004 | Jung et al. ............ 386/95 |
| 2004/0141436 A1 | 7/2004 | Monahan |
| 2004/0179820 A1 | 9/2004 | Kashiwagi et al. |
| 2004/0184780 A1* | 9/2004 | Seo et al. ............ 386/95 |
| 2004/0213552 A1 | 10/2004 | Kato et al. |
| 2005/0019007 A1 | 1/2005 | Kato et al. |
| 2005/0025461 A1 | 2/2005 | Kato et al. |
| 2005/0066352 A1* | 3/2005 | Herley ............ 725/19 |
| 2005/0078948 A1* | 4/2005 | Yoo et al. ............ 386/95 |
| 2005/0105888 A1 | 5/2005 | Hamada et al. |
| 2005/0163463 A1 | 7/2005 | Schick et al. |
| 2005/0196143 A1 | 9/2005 | Kato et al. |
| 2005/0201718 A1 | 9/2005 | Kato |
| 2005/0254363 A1 | 11/2005 | Hamada et al. |
| 2006/0036960 A1 | 2/2006 | Loui |
| 2006/0188223 A1 | 8/2006 | Ikeda et al. |
| 2006/0195633 A1 | 8/2006 | Plourde, Jr. |
| 2006/0288302 A1* | 12/2006 | Yahata et al. ............ 715/764 |
| 2008/0166067 A1 | 7/2008 | Roth et al. |

FOREIGN PATENT DOCUMENTS

| | | |
|---|---|---|
| AU | 2003282415 | 6/2004 |
| CN | 1240293 | 1/2000 |
| CN | 1244710 | 2/2000 |
| CN | 1245956 A | 3/2000 |
| CN | 1245957 | 3/2000 |
| CN | 1263672 | 8/2000 |
| CN | 1063863 | 3/2001 |
| CN | 1300022 | 6/2001 |
| CN | 1303094 | 7/2001 |
| CN | 1304533 A | 7/2001 |
| CN | 1381137 A | 11/2002 |
| DE | 69907758 | 2/2004 |
| DE | 60002774 | 3/2004 |
| EP | 0 737 980 A2 | 10/1996 |
| EP | 0 856 849 | 8/1998 |
| EP | 0 978 994 | 2/2000 |
| EP | 1003337 | 5/2000 |
| EP | 1 041 566 B1 | 10/2000 |
| EP | 1 045 393 | 10/2000 |
| EP | 0 949 825 | 11/2000 |
| EP | 1056092 | 11/2000 |
| EP | 1056094 | 11/2000 |
| EP | 1 103 974 | 5/2001 |
| EP | 1102270 | 5/2001 |
| EP | 1 113 439 | 7/2001 |
| EP | 1128386 | 8/2001 |
| EP | 0 942 609 | 10/2001 |
| EP | 1198133 | 4/2002 |
| EP | 1 204 269 A1 | 5/2002 |
| EP | 1286544 | 2/2003 |
| EP | 1 300 851 | 4/2003 |
| EP | 1550121 | 7/2005 |
| FR | 2 581 771 | 11/1986 |
| GB | 2 119 151 | 11/1983 |
| GB | 2359210 | 8/2001 |
| JP | 1-300777 | 12/1989 |
| JP | 01-300777 | 12/1989 |
| JP | 5-137114 | 6/1993 |
| JP | 6-311481 | 11/1994 |
| JP | 07-57436 | 3/1995 |
| JP | 07-262646 | 10/1995 |
| JP | 1997-017101 | 1/1997 |
| JP | 9-252450 | 9/1997 |
| JP | 9-261584 | 10/1997 |
| JP | 10-154373 | 6/1998 |
| JP | 11-213628 | 8/1999 |
| JP | 2000-004421 | 1/2000 |
| JP | 2000-20554 | 1/2000 |
| JP | 2000-041212 | 2/2000 |
| JP | 2000-59714 | 2/2000 |
| JP | 2000-251402 | 9/2000 |
| JP | 2000-268537 | 9/2000 |
| JP | 2000-333126 | 11/2000 |
| JP | 2001-52467 | 2/2001 |
| JP | 2001-069460 | 3/2001 |
| JP | 2001-078123 | 3/2001 |
| JP | 2001-086458 | 3/2001 |
| JP | 2001-103417 | 4/2001 |
| JP | 2001-155466 | 6/2001 |
| JP | 2001-157155 | 6/2001 |
| JP | 2001-167529 | 6/2001 |
| JP | 2001-216739 | 8/2001 |
| JP | 2001-231015 | 8/2001 |
| JP | 2001-243721 | 9/2001 |
| JP | 2001-285772 | 10/2001 |
| JP | 2002-56651 | 2/2002 |
| JP | 2002-082684 | 3/2002 |
| JP | 2002-157835 | 5/2002 |
| JP | 2002-158965 | 5/2002 |
| JP | 2002-158972 | 5/2002 |
| JP | 2002-208258 | 7/2002 |
| JP | 2002-325221 | 11/2002 |
| JP | 2002-354424 | 12/2002 |
| JP | 2003-006979 | 1/2003 |
| JP | 2003-009090 | 1/2003 |
| JP | 2003-16764 | 1/2003 |
| JP | 2003-045154 | 2/2003 |
| JP | 2003-299015 | 10/2003 |

| | | |
|---|---|---|
| JP | 2004-336566 | 11/2004 |
| JP | 04-165895 | 10/2008 |
| KR | 1998-086030 | 12/1998 |
| KR | 1999-0070106 | 9/1999 |
| KR | 2000-2840 | 1/2000 |
| KR | 2000-0002921 | 1/2000 |
| KR | 2000-0002922 | 1/2000 |
| KR | 2000-14419 | 3/2000 |
| KR | 2000-0018987 | 4/2000 |
| KR | 2001-0013565 | 2/2001 |
| KR | 2001-21485 | 3/2001 |
| KR | 2001-0027114 | 4/2001 |
| KR | 2001-0051295 | 6/2001 |
| KR | 2001-0066211 | 7/2001 |
| KR | 2002-0021402 | 3/2002 |
| KR | 2002-0064463 | 8/2002 |
| KR | 2003-0064546 | 2/2003 |
| RU | 2229174 | 5/2004 |
| TW | 517495 | 1/2003 |
| WO | WO 98/37699 | 8/1998 |
| WO | WO 99/53694 | 10/1999 |
| WO | WO 00/33532 | 6/2000 |
| WO | WO 00/55857 A1 | 9/2000 |
| WO | WO 00/60598 | 10/2000 |
| WO | WO 00/74061 | 12/2000 |
| WO | WO 01/11626 | 2/2001 |
| WO | WO 01/82608 | 11/2001 |
| WO | WO 02/062061 | 8/2002 |
| WO | WO 2004/023234 | 3/2004 |
| WO | WO 2004/023484 | 3/2004 |
| WO | WO 2004/023485 | 3/2004 |
| WO | WO 2004/066281 | 8/2004 |
| WO | WO 2004/075194 | 9/2004 |
| WO | WO 2004/086396 | 10/2004 |

OTHER PUBLICATIONS

U.S. Appl. No. 10/766,211, filed Sep. 23, 2004, Seo.
European Telecommunications Standards Institute, "*Digital Video Broadcasting (DVB); Subtitling systems*", 1997, pp. 1-45.
United States Office Action dated May 29, 2008.
United States Office Action dated Jun. 2, 2008.
Japanese Office Action dated May 20, 2008.
European Office Action dated May 16, 2008.
Chinese Office Action dated Oct. 31, 2008 with English translation.
Chinese Office Action dated Dec. 5, 2008 with English translation.
United States Office Action dated Jul. 9, 2008.
Japanese Office Action dated Jun. 10, 2008.
Japanese Office Action dated Jun. 20, 2008.
"Information technology—Generic coding of moving pictures and associated audio information: Systems", Jan. 12, 2000.
English translation of Chinese Office Action dated Aug. 8, 2008.
European Search Report dated Jul. 30, 2008.
European Search Report dated Sep. 1, 2008.
Japanese Office Action dated Sep. 24, 2008.
Japanese Office Action dated Sep. 16, 2008.
International Search Report dated Mar. 9, 2004.
Office Action for corresponding Japanese Application No. 2004-533859 dated Oct. 20, 2009 and English translation thereof.
Office Action for corresponding Canadian Application No. 2,474,229 dated Dec. 10, 2009.
Notice of Allowance dated Jun. 23, 2010 by the Korean Patent Office for Application No. 10-2005-7014291.
Notice of Allowance dated Jul. 16, 2010 by the Japanese Patent Office for Application No. 2004-553272 with English translation.
Office Action for Canadian patent application No. 2,474,229 dated Oct. 20, 2010 (in English).

* cited by examiner

Case 1 : Picture Duration Limit

RECORDING MEDIUM HAVING DATA STRUCTURE FOR MANAGING REPRODUCTION OF DATA RECORDED THEREON AND RECORDING AND REPRODUCING METHODS AND APPARATUSES

The present invention claims priority under 35 U.S.C. 119 on Korean Application No. 10-2002-0072519 filed Nov. 20, 2002; the contents of which are incorporated by reference in their entirety.

BACKGROUND OF THE INVENTION

1. Field of the Invention

The present invention relates to a recording medium having a data structure for managing reproduction of at least still images recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available in the near future. The Blu-ray Disc Rewritable (BD-RE) and Blu-ray Disk ROM (BD-ROM) are examples of these new optical disks.

While the standard for BD-RE has been published, the standardization for high-density read-only optical disks such as the Blu-ray ROM (BD-ROM) is still under way. Consequently, an effective data structure for managing reproduction of still images recorded on the high-density read-only optical disk such as a BD-ROM is not yet available.

SUMMARY OF THE INVENTION

The recording medium according to the present invention includes a data structure for managing reproduction of data recorded on the recording medium.

In one exemplary embodiment, a recording area of the recording medium stores at least first and second clip stream files and a playlist. The first clip stream file includes video data representing at least one still image, and the second clip stream file includes at least audio data. The playlist includes a playitem and a sub-playitem. The playitem indicates at least a portion of the first clip stream file to reproduce, and the sub-playitem indicates at least a portion of the second clip stream file to reproduce.

The present invention further provides apparatuses and methods for recording and reproducing the data structure according to the present invention.

BRIEF DESCRIPTION OF THE DRAWINGS

The above features and other advantages of the present invention will be more clearly understood from the following detailed description taken in conjunction with the accompanying drawings, in which.

DESCRIPTION OF THE EMBODIMENTS

In order that the invention may be fully understood, exemplary embodiments thereof will now be described with reference to the accompanying drawings.

Figure 1:
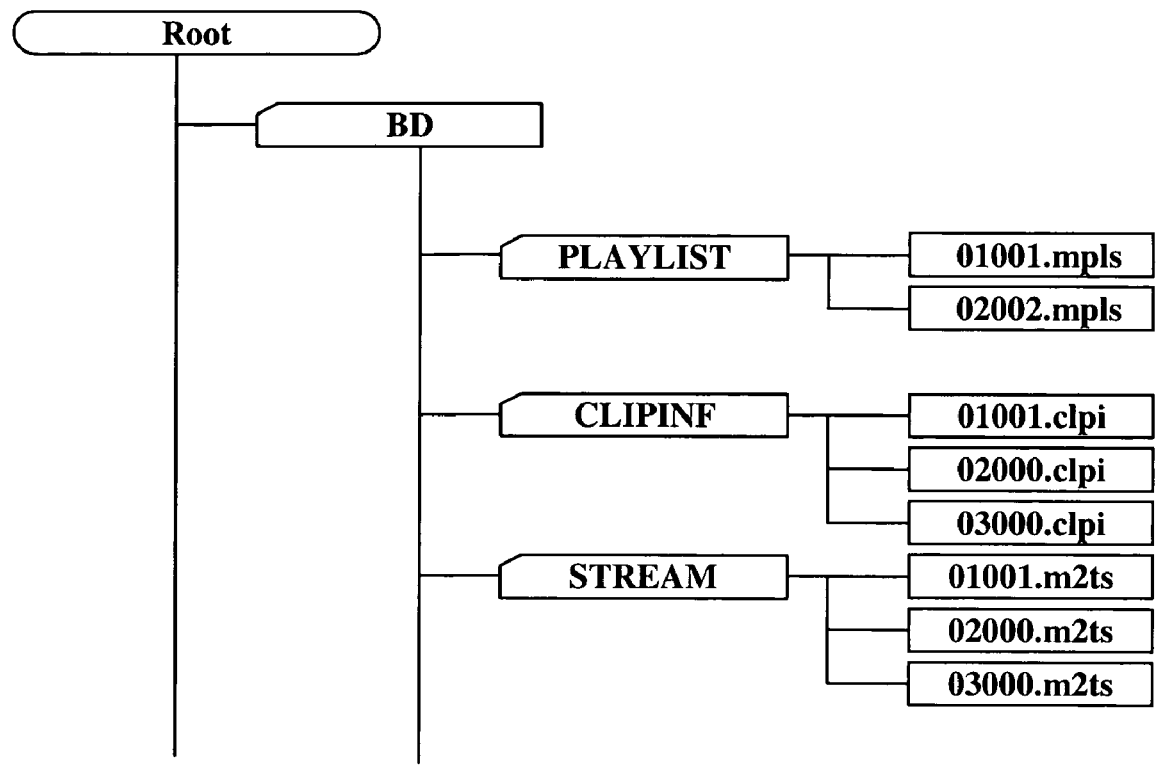
FIG. 1 illustrates an exemplary embodiment of a recording medium file or data structure according to the present invention.

A high-density recording medium such as a high density optical disk, for example, a Blu-Ray ROM (BD-ROM), BD-RE, etc. in accordance with the invention may have a file or data structure for managing reproduction of video and audio data as shown in FIG. 1. Some aspects of the data structure according to the present invention shown in FIG. 1 are the same as the well-known BD-RE standard, as such these aspects will not be described in great detail.

As shown in FIG. 1, the root directory contains at least one BD directory. The BD directory includes general files (not shown), a PLAYLIST directory in which playlist files (e.g., *.mpls) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clip streams files or just clip files. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip file (e.g., presentation time stamps on an ATC or STC basis). Expressed another way, the playlist file identifies playitems, each playitem points to a clip file or portion thereof and identifies the clip information file associated with the clip file. The clip information file is used, among other things, to map the playitems to the clip file of source packets.

The general information files (not shown) provide general information for managing the reproduction of the A/V streams recorded on the optical disk.

Figure 2:
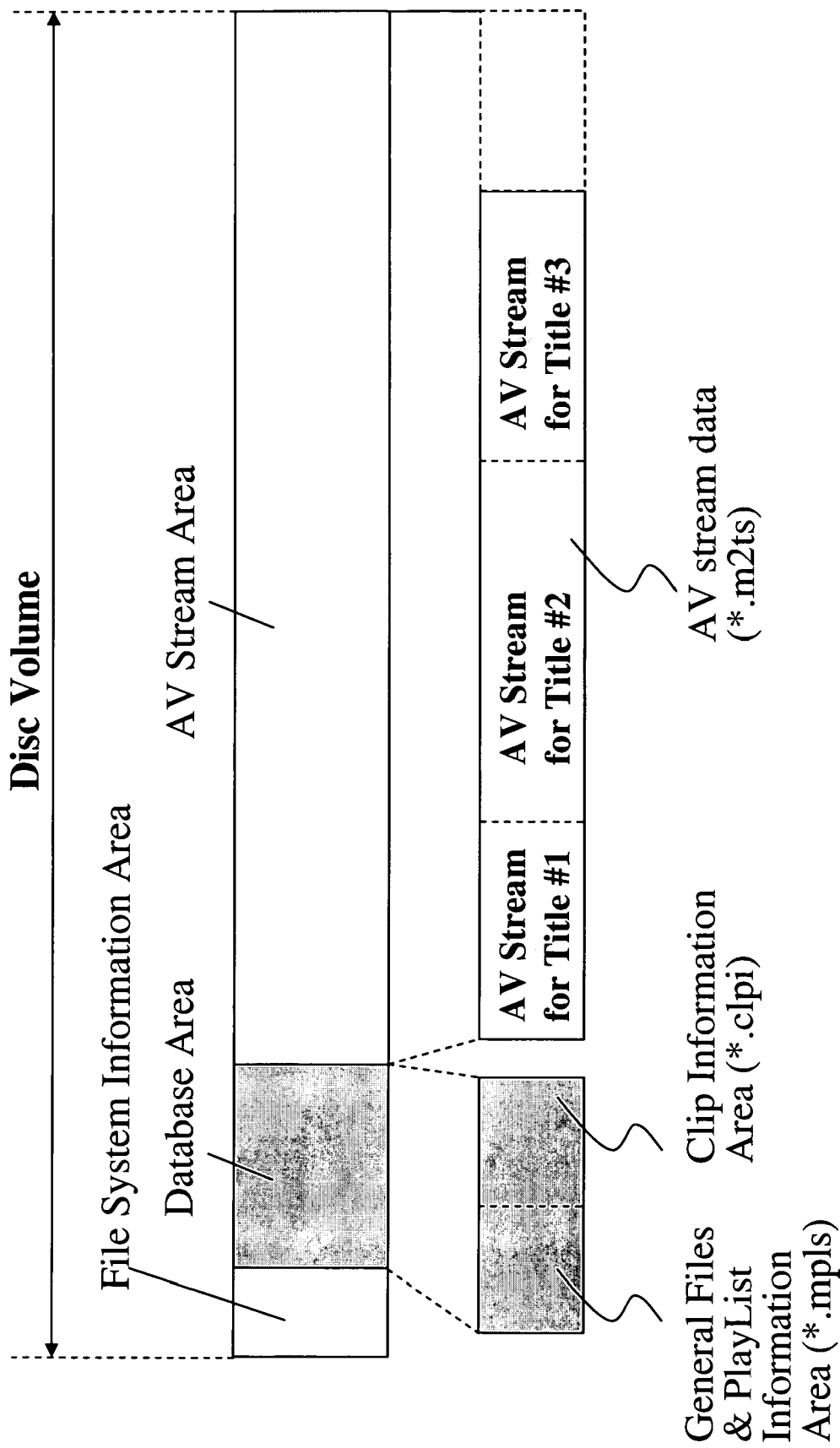
FIG. 2 illustrates an example of a recording medium having the data structure of FIG. 1 stored thereon.

In addition to illustrating the data structure of the recording medium according to an embodiment of the present invention, FIG. 1 represents the areas of the recording medium. For example, the general information files are recorded in one or more general information areas, the playlist directory is recorded in one or more playlist directory areas, each playlist in a playlist directory is recorded in one or more playlist areas of the recording medium, etc. FIG. 2 illustrates an example of a recording medium having the data structure of FIG. 1 stored thereon. As shown, the recording medium includes a file system information area, a data base area and an A/V stream area. The data base area includes a general information file and playlist information area and a clip information area. The general information file and playlist information area have the general information files recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM and BD-RE optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version, camera angle, etc. represents a different reproduction path, and the video data in these instances is referred to as multiple reproduction path video data.

Because of the large storage capacity of the newer, high-density recording media such as BD-ROM still images may be recorded and reproduced in an organized and/or user interactive fashion, for example, as slideshows. The data structure for managing reproduction of still images for a high-density optical disk in accordance with embodiments of the present invention will be described along with methods and apparatuses according to embodiments of the present invention for recording and reproducing still images.

Figure 3:
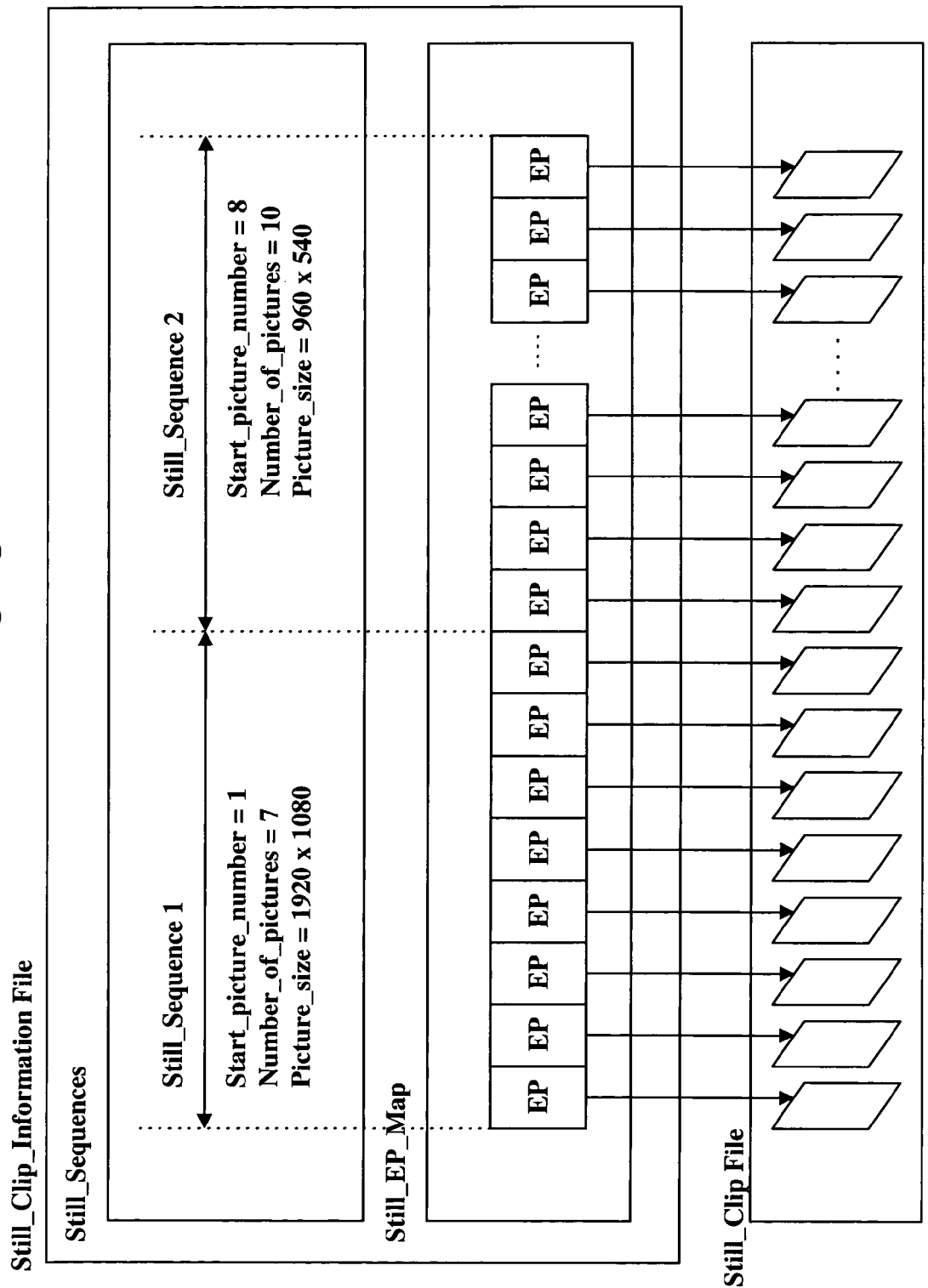
FIG. 3 illustrates a method of managing still images for a high-density recording medium in accordance with one exemplary embodiment of the invention.

A method of managing still images for a high-density recording medium in accordance with one exemplary embodiment of the invention records a plurality of still image pictures on a high density recording medium such as a BD-ROM based in part on the file structure and recording format of the BD-RE. As shown in FIG. 3, the plurality of still images (e.g., JPEG, etc.) are stored as a separate clip file Still_Clip File, separate from clip files of audio and/or video data (e.g. movie video data).

After the clip file Still_Clip File is stored, a clip information file Still_Clip_Information File corresponding to the clip file Still_Clip File is created and recorded. The clip information file Still_Clip_Information File includes an entry point (EP) map and a plurality of sequences Still_Sequence 1 and Still_Sequence 2. Each of the entry points contained in the entry point map corresponds to a still image picture. For example, each entry point provides a start address (e.g., source packet number) of the beginning of the video data forming the associated still image picture. In one exemplary embodiment, each still image picture at least begins with an MPEG2 I (intra-coded) picture, and therefore, the start address point to this I picture. In another exemplary embodiment, the still image picture only includes an I picture of video data.

An entry point for a still image picture may include address information and duration information for the still image picture. Instead of or addition to the duration information, the entry point may include a presentation time stamp (PTS) for the associated still image picture. The entry point may further include duration information or a presentation time stamp (PTS) of audio data to be played simultaneously with the still image picture.

As shown in FIG. 3, each of the still sequences included in the clip information file Still_Clip_Information File has the information fields of 'Start_picture_number', 'Number_of_pictures', and 'Picture_size'. The name of each field is self explanatory as to the information being conveyed in that field. Each of the still image pictures associated with a sequence have the same attribute and picture size.

As shown, the first sequence Still_sequence 1 has the information that Start_picture_number=1, Number_of_pictures=7, and Picture_size=1920×1080; and the second still sequence Still_sequence 2 has the information that Start_picture_number=8, Number_of_pictures=10, and Picture_size=960×540. Furthermore, the start of the still sequence may be represented by an offset picture number.

The display of still images and audio data for playback during display of still images may also be managed at the playlist level according to exemplary embodiments of the present invention. In one exemplary embodiment, playitems of a playlist are used to manage reproduction of video data forming still image pictures and sub-playitems of the playlist are used to manage reproduction of audio data for playback with the still image pictures. A playitem may indicate reproduction of a single still image picture. Or, a playitem may indicate reproduction of a group of still image pictures, and also may indicate the display mode for the group.

Figure 4:
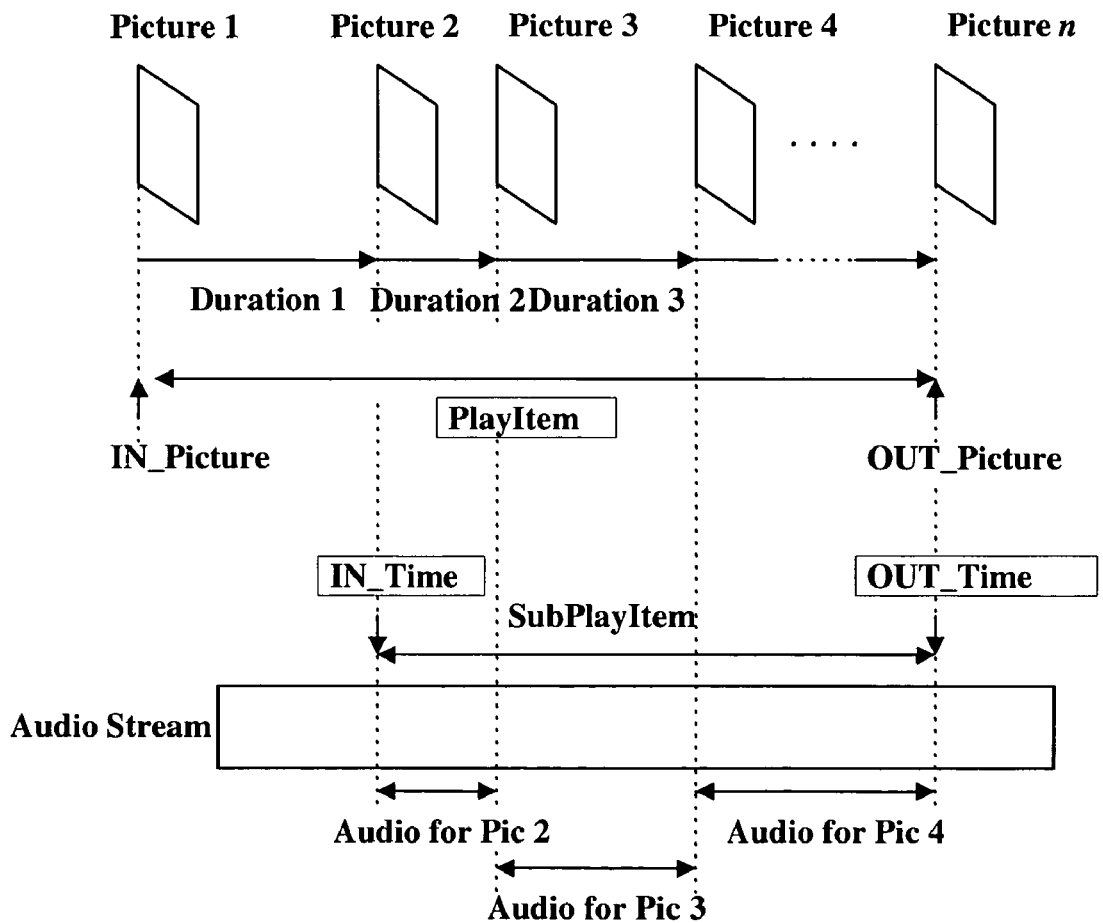
FIG. 4 illustrates an exemplary embodiment of managing reproduction of still image pictures and audio data using playitems and sub-playitems in association with the embodiment of FIG. 3.

FIG. 4 illustrates an exemplary embodiment of managing reproduction of still image pictures and audio data using playitems and sub-playitems in association with the embodiment of FIG. 3. As shown, the playitem of a playlist includes the information 'IN_Picture' and 'Out_Picture', which indicates the beginning and ending of a group of still image pictures Picture 1-Picture n in a clip file such as the Still_Clip File of FIG. 3. As discussed above with respect to FIG. 3, in an exemplary embodiment, an entry point is associated with each still image. The entry points form at least part of an EP map in a clip information file associated with the clip file including the still image pictures Picture 1-Picture n. The entry points provide the duration and/or PTS for each picture. As shown in FIG. 4, the sub-playitem of the playlist includes the information 'IN_Time and 'Out_time', which indicates the beginning and ending of an audio stream in a clip file separate from the Still_Clip File to be played in association with the still image pictures. As further shown in FIG. 4, the 'IN_Time and 'Out_Time' information provided by the sub-playitem is synchronized with the 'IN_Picture' and 'Out_Picture' provided by the playitem such that during reproduction, an optical disk reproducing apparatus such as described in detail below plays back portions of the audio data for the second, third and fourth still image pictures Pictures 2, 3 and 4 in synchronization with the display of those pictures.

Figure 5:
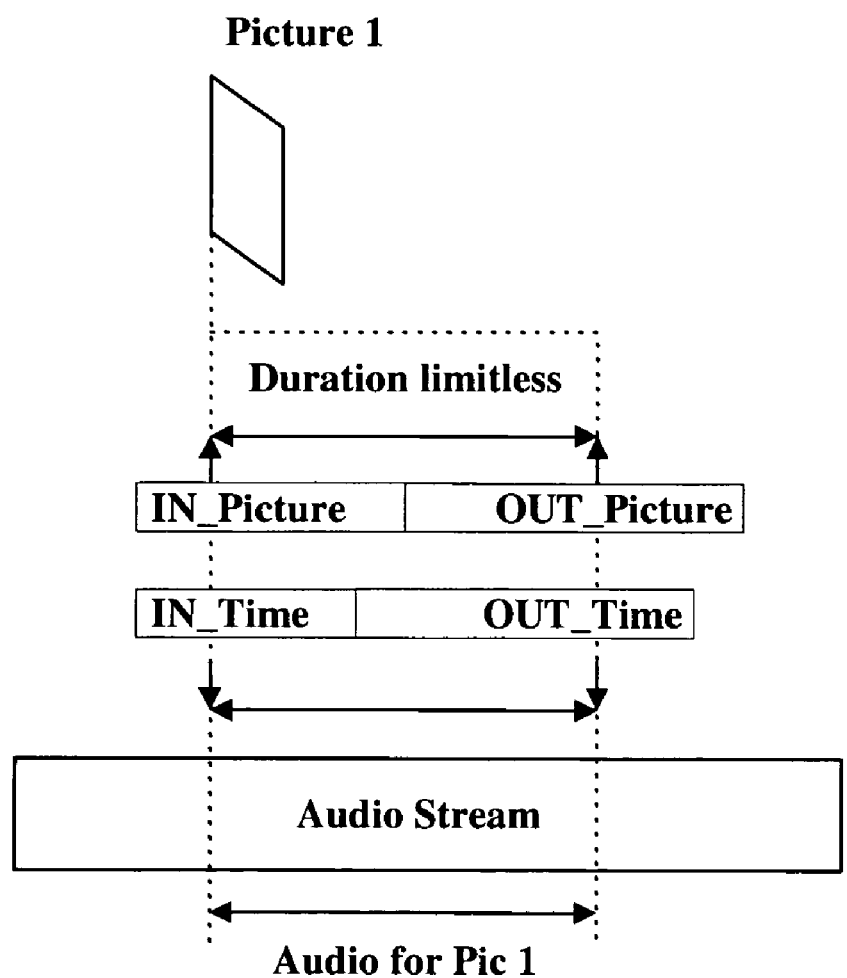
FIG. 5 illustrates an exemplary embodiment of the present invention where still image pictures have an unlimited display duration.

While FIG. 4 illustrated display of still image pictures for limited durations, FIG. 5 illustrates an exemplary embodiment of the present invention where still image pictures have an unlimited display duration. In this embodiment, the entry point associated with a still image picture Picture 1 has been set to limitless. As a result, an optical disk reproducing apparatus such as described in detail below displays the still image picture indefinitely. Furthermore, FIG. 5 shows that the playlist including the playitem instructing reproduction of the still image picture Picture 1 also includes a sub-playitem instructing reproduction of a portion of audio data in a separate clip file. When the display duration of the still image picture is limitless, the optical disk producing apparatus plays the audio data associated with the still image picture repeatedly with no limit, or alternatively for a prescribed number of repetitions. Also, in response to the limitless duration of the still image picture, the optical disk reproducing apparatus displays the still image picture until user input is received.

Figure 6:
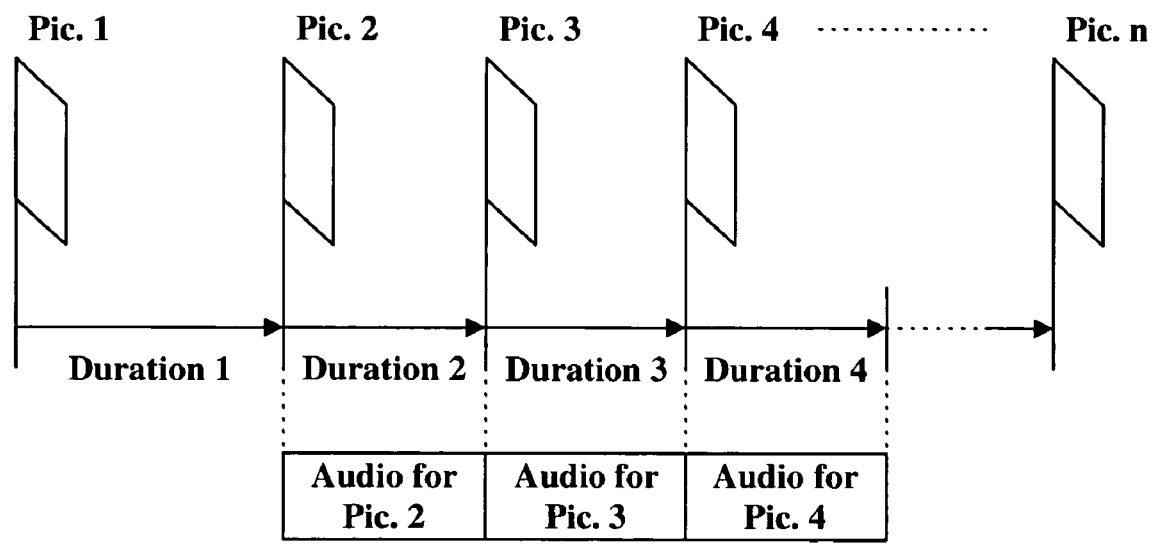
FIG. 6 illustrates an example of a sequential display slide show in which still image pictures are displayed for limited durations.

FIG. 6 illustrates an example of a sequential display slide show based on the above-described data structures in which still image pictures are displayed for limited durations. In an example shown in FIG. 6, the optical disk reproducing apparatus performs a slide show, which sequentially displays a plurality of still image pictures stored in a clip file according to the duration information included in the entry points of the clip information file associated with the clip file.

Alternatively, a presentation time stamp (PTS) for each of the still images may recorded instead of the duration information. In this case, the optical disk reproducing apparatus performs the slide show in the same manner using the presentation time stamp (PTS) associated with each image to determine when to start displaying the associated still image.

If an entry point also includes audio duration information or audio presentation time stamps (PTS) related to the still image pictures, the optical disk reproducing apparatus performs a slide show in the same manner using the audio duration information or audio presentation time stamps.

Figure 7:
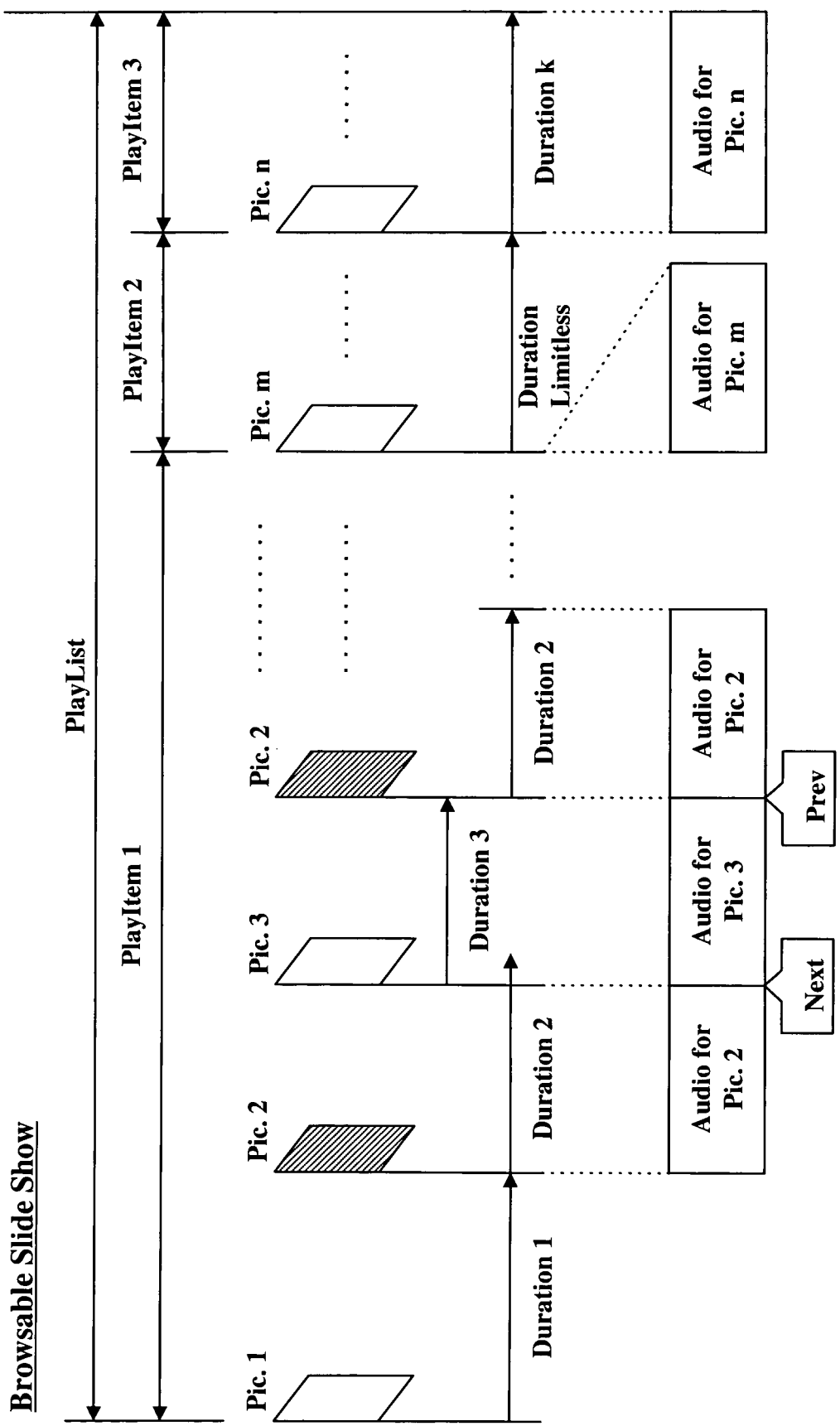
FIG. 7 illustrates an example of a browsable slide show performed according to exemplary embodiments of the present invention.

The optical disk reproducing apparatus may also perform a browsable slide show in which a plurality of still image pictures are displayed with unlimited duration. In a browsable slide show, the optical disk reproducing apparatus skips between playing still images based on user input. FIG. 7 illustrates an example of a browsable slide show based on the above-described data structures performed according to exemplary embodiments of the present invention. As shown, a playlist includes first-third playitems PlayItem 1, PlayItem 2 and PlayItem 3. Each of the first-third playitems PlayItem 1, PlayItem 2 and PlayItem 3 includes information for reproducing one or more still image pictures from one or more clip files including still image pictures.

As shown in FIG. 7, the portion of the clip file referenced by the first playitem PlayItem 1 includes at least first, second and third pictures Pic. 1, Pic. 2 and Pic. 3. FIG. 7 further graphically illustrates that the respective entry points associated with the first, second and third pictures Pic. 1, Pic. 2 and Pic. 3 provide for respective limited display durations Duration 1, Duration 2, and Duration 3.

Accordingly, the still image pictures of the first playitem PlayItem 1 are displayed sequentially. However, if during the display of a still image picture the optical disk reproducing apparatus receives user input instructing the display of a previous or next still image picture, the optical disk reproducing apparatus ends display of the current still image picture and displays the previous or next still image picture. FIG. 7 illustrates the example where during the display of the second still image picture Pic. 2, user input instructing display of a next still image picture is received. When the request is received, the optical disk reproducing apparatus refers to the entry point for the next still image picture; namely, the entry point following the entry point for the currently displayed still image. Using this next entry point, the next still image picture Pic. 3 is displayed. FIG. 7 further illustrates the example where during the display of the third still image picture Pic. 3, user input instructing display of a previous still image picture is received. When the request is received, the optical disk reproducing apparatus refers to the entry point for the previous still image picture; namely, the entry point preceding the entry point for the currently displayed still image. Using this previous entry point, the previous still image picture Pic. 2 is displayed.

As further shown in FIG. 7, if audio data is associated with each still image picture, then the user input also effects changes in the reproduced audio data in the same manner as described above with respect to the video data for the still image pictures.

It will further be appreciated from FIG. 7 that the browsable slide show takes place with respect to still image pictures having limitless display durations such as shown in the second playitem PlayItem 2. The skipping from one still image picture to a next or previous still image picture takes place in the same manner as described above with respect to the first playitem PlayItem 1.

Figure 8:
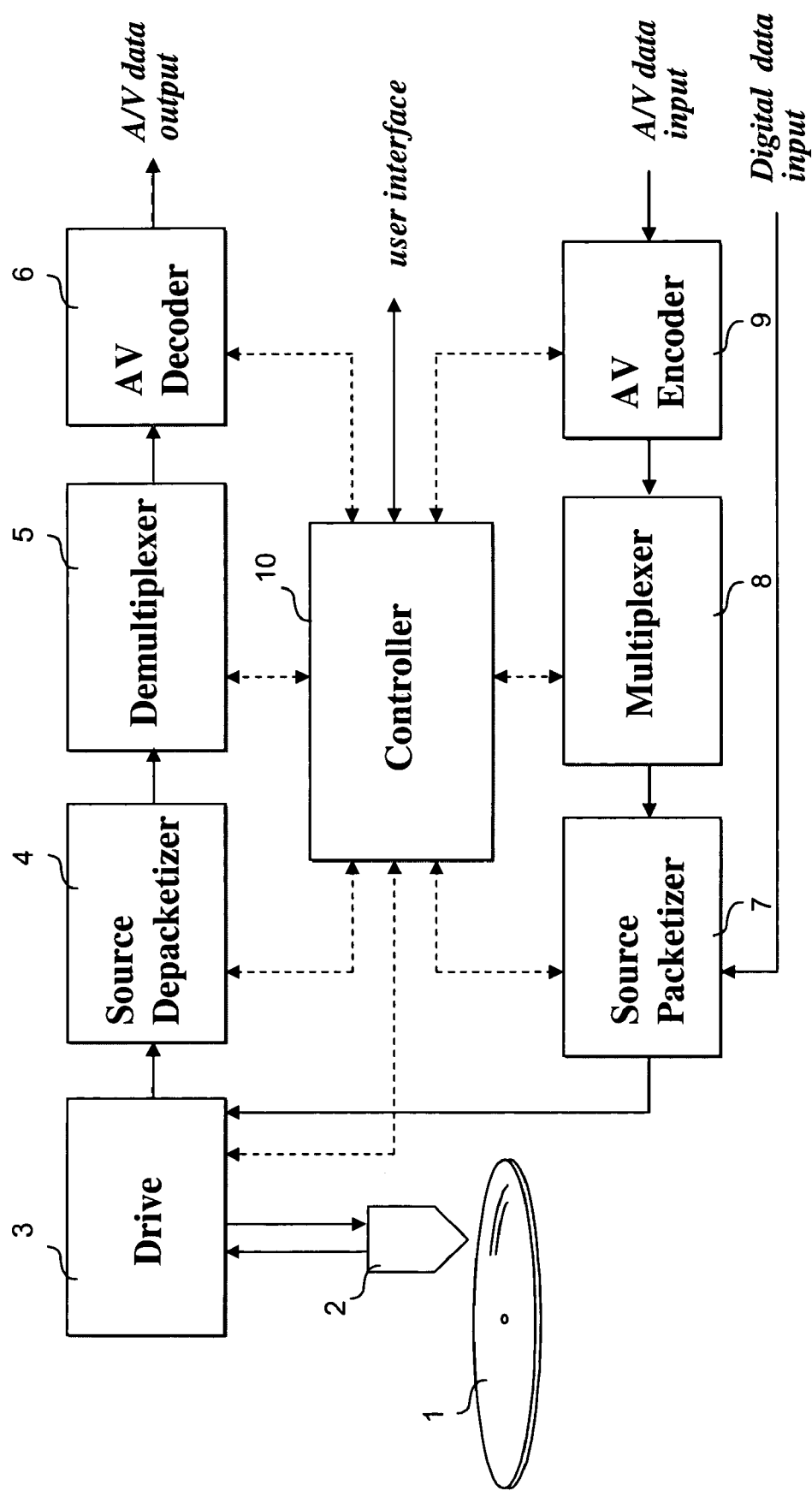
FIG. 8 illustrates a schematic diagram of an embodiment of an optical disk recording and reproduction apparatus of the present invention.

FIG. 8 illustrates a schematic diagram of an embodiment of an optical disk recording and reproducing apparatus according to the present invention. As shown, an AV encoder 9 receives and encodes data (e.g., still image data, audio data, etc.). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 8, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the data being recorded on the optical disk. For example, based on information received via the user interface (e.g., instruction set saved on disk, provided over an intranet or internet by a computer system, etc.) the controller 10 controls the drive 3 to record one or more of the data structures of FIGS. 1-7 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk. For example, as discussed above with respect to the embodiments of the present invention, a still image or still images may be reproduced in association with audio data based on the navigation information. Furthermore, an image or group of images may be reproduced as a slideshow or portion of a slideshow. As also discussed, a slideshow may be synchronized, browsable, etc.

The reproduced source packets are received by a source depacketizer 4 and converted into a data stream (e.g., an MPEG-2 transport packet stream, etc.). A demultiplexer 5 demultiplexes the data stream into encoded data. An AV decoder 6 decodes the encoded data to produce the original data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 8 has been described as a recording and reproducing apparatus, it will be understood that only a recording or only a reproducing apparatus may be provided using those portions of FIG. 8 providing the recording or reproducing function.

As will be appreciated from the forgoing disclosure, the present invention provides a recording medium having a data structure for managing still images recorded on a high-density recording medium (e.g., a high-density optical disk such as a BD-ROM). For example, the data structure allows for displaying still images and possibly audio data in various ways.

As apparent from the above description, the present invention provides methods and apparatuses for recording a data structure on a high density recording medium for managing still images recorded on the recording medium.

The above description further provides methods and apparatus for reproducing still images recorded on a high density recording medium based on a data structure, also recorded on the high density recording medium, for managing the reproduction of still images.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A non-transitory computer readable medium having a data structure for managing reproduction of data recorded on the computer readable medium, comprising:

a data area storing at least first and second clip stream files, the first clip stream file including video data representing at least one still image, the second clip stream file including audio data, the still image being reproduced as a slideshow, the audio data being reproduced with the slideshow; and a data base area including a playlist area storing a playlist file, the playlist file including at least one playitem and at least one sub-playitem, the at least one playitem indicating an in-point and an out-point of the first clip stream file to reproduce the at least one still image and providing a display mode, the display mode indicating to display the at least one still image for a finite period of time if the at least one still image is to be displayed for a finite period of time, the display mode indicating to display the at least one still image for an infinite period of time if the at least one still image is to be displayed for an infinite period of time, the at least one sub-playitem indicating an in-point and an out-point of the second clip stream file to reproduce the audio data, wherein the at least one playitem further includes duration information indicating a length of time to display the at least one still image when the display mode indicates to display the at least one still image for a finite period of time, and wherein the data base area includes first mapping information between a presentation time and a unit of the first clip stream file and second mapping information between a presentation time and a unit of the second clip stream file, and the first mapping information includes at least one entry point, every still image in the first clip stream file being pointed to by an entry point, wherein coding information in the data base area indicates coding format of at least one of the first clip stream file and the second clip stream file.

2. The non-transitory computer readable medium of claim 1, wherein the at least one sub-playitem includes indicator indicating the at least one playitem related to the at least one sub-playitem such that the audio data is played in association with the at least one still image.

3. The non-transitory computer readable medium of claim 1, wherein the data base area includes a clip information area storing first and second clip information files, the first clip information file being associated with the first clip stream file, the second clip information file being associated with the second clip stream file.

4. The non-transitory computer readable medium of claim 3, wherein the still images in the first clip stream file are divided into at least one still image unit, the first clip information file including start number information indicating image number of a start still image among the still images included in the corresponding still image unit, and total number information indicating a total number of the still images included in the corresponding still image unit, and size information indicating a size of each still image included in the corresponding still image unit.

5. The non-transitory computer readable medium of claim 1, wherein the at least one still image is selected from the video data.

6. A method of recording a data structure for managing reproduction of data recorded on a recording medium, comprising:

recording at least first and second clip stream files in a data area of the recording medium, the first clip stream file including video data representing at least one still image, the second clip stream file including audio data, the still image being reproduced as a slideshow, the audio data being reproduced with the slideshow; and recording a playlist file in a data base area of the recording medium, the playlist file including at least one playitem and at least one sub-playitem, the at least one playitem indicating an in-point and an out-point of the first clip stream file to reproduce the at least one still image and providing a display mode, the display mode indicating to display the at least one still image for a finite period of time if the at least one still image is to be displayed for a finite period of time, the display mode indicating to display the at least one still image for an infinite period of time if the at least one still image is to be displayed for an infinite period of time, the at least one sub-playitem indicating an in-point and an out-point of the second clip stream file to reproduce the audio data, wherein the at least one playitem further includes duration information indicating a length of time to display the at least one still image when the display mode indicates to display the at least one still image for a finite period of time, and wherein the data base area includes first mapping information between a presentation time and a unit of the first clip stream file and second mapping information between a presentation time and a unit of the second clip stream file, and the first mapping information includes at least one entry point, every still image in the first clip stream file being pointed to by an entry point, wherein coding information in the data base area indicates coding format of at least one of the first clip stream file and the second clip stream file.

7. The method of claim 6, wherein the at least one sub-playitem includes indicator indicating the at least one playitem related to the at least one sub-playitem such that the audio data is played in association with the at least one still image.

8. The method of claim 6, wherein the data base area includes a clip information area storing first and second clip information, the first clip information file being associated with the first clip stream file, the second clip information file being associated with the second clip stream file.

9. The method of claim 8, wherein the still images in the first clip stream file are divided into at least one still image unit, the first clip information file including start number information indicating image number of a start still image among the still images included in the corresponding still image unit, and total number information indicating a total number of the still images included in the corresponding still image unit, and size information indicating a size of each still image included in the corresponding still image unit.

10. The method of claim 6, wherein the at least one still image is selected from the video data.

11. A method of reproducing a data structure for managing reproduction of data recorded on a recording medium, comprising:

reproducing at least first and second clip stream files from a data area of the recording medium, the first clip stream file including video data representing at least one still image, the second clip stream file including audio data, the still image being reproduced as a slideshow, the audio data being reproduced with the slideshow; and reproducing a playlist file from a data base area of the recording medium, the playlist file including at least one playitem and at least one sub-playitem, the at least one playitem indicating an in-point and an out-point of the first clip stream file to reproduce the at least one still image and providing a display mode, the display mode indicating to display the at least one still image for a finite period of time if the at least one still image is to be displayed for a finite period of time, the display mode indicating to display the at least one still image for an infinite period of time if the at least one still image is to be displayed for an infinite period of time, the at least one sub-playitem indicating an in-point and an out-point of the second clip stream file to reproduce the audio data, wherein the at least one playitem further includes duration information indicating a length of time to display the at least one still image when the display mode indicates to display the at least one still image for a finite period of time, and wherein the data base area includes first mapping information between a presentation time and a unit of the first clip stream file and second mapping information between a presentation time and a unit of the second clip stream file, and the first mapping information includes at least one entry point, every still image in the first clip stream file being pointed to by an entry point, wherein coding information in the data base area indicates coding format of at least one of the first clip stream file and the second clip stream file.

12. The method of claim 11, wherein the at least one sub-playitem includes indicator indicating the at least one playitem related to the at least one sub-playitem such that the audio data is played in association with the at least one still image.

13. The method of claim 11, wherein the data base area includes a clip information area storing first and second clip information, the first clip information file being associated with the first clip stream file, the second clip information file being associated with the second clip stream file.

14. The method of claim 13, wherein the still images in the first clip stream file are divided into at least one still image unit, the first clip information file including start number information indicating image number of a start still image among the still images included in the corresponding still image unit, and total number information indicating a total number of the still images included in the corresponding still image unit, and size information indicating a size of each still image included in the corresponding still image unit.

15. The method of claim 11, wherein the recording medium is a read-only recording medium.

16. The method of claim 11, wherein the recording medium is a recordable recording medium.

17. The method of claim 11, wherein the at least one still image is selected from the video data.

18. An apparatus for recording a data structure for managing reproduction of data recorded on a recording medium, comprising:

a pick up configured to record data on the recording medium; and a controller configured to control the pick up to record at least first and second clip stream files in a data area and a playlist file in a data base area of the recording medium, the first clip stream file including video data representing at least one still image, the second clip stream file including audio data, the still image being reproduced as a slideshow, the audio data being reproduced with the slideshow, the playlist file including at least one playitem and at least one sub-playitem, the at least one playitem indicating an in-point and an out-point of the first clip stream file to reproduce the at least one still image and providing a display mode indicating to display the at least one still image for a finite period of time if the at least one still image is to be displayed for a finite period of time, the display mode indicating to display the at least one still image for an infinite period of time if the at least one still image is to be displayed for an infinite period of time, the at least one sub-playitem indicating an in-point and an out-point of the second clip stream file to reproduce the audio data, wherein the at least one playitem further includes duration information indicating a length of time to display the at least one still image when the display mode indicates to display the at least one still image for a finite period of time, and wherein the data base area includes first mapping information between a presentation time and a unit of the first clip stream file and second mapping information between a presentation time and a unit of the second clip stream file, and the first mapping information includes at least one entry point, every still image in the first clip stream file being pointed to by an entry point, wherein coding information in the data base area indicates coding format of at least one of the first clip stream file and the second clip stream file.

19. The apparatus of claim 18, wherein the at least one sub-playitem includes indicator indicating the at least one playitem related to the at least one sub-playitem such that the audio data is played in association with the at least one still image.

20. The apparatus of claim 18, wherein the data base area includes a clip information area storing first and second clip information, the first clip information file being associated with the first clip stream file, the second clip information file being associated with the second clip stream file.

21. The apparatus of claim 20, wherein the still images in the first clip stream file are divided into at least one still image unit, the first clip information file including start number information indicating image number of a start still image among the still images included in the corresponding still image unit, and total number information indicating a total number of the still images included in the corresponding still image unit, and size information indicating a size of each still image included in the corresponding still image unit.

22. The apparatus of claim 18, wherein the at least one still image is selected from the video data.

23. An apparatus for reproducing a data structure for managing reproduction of data recorded on a recording medium, comprising:

a pick up configured to reproduce data recorded on the recording medium; and a controller configured to control the pick up to reproduce at least first and second clip stream files from a data area and a playlist file from a data base area of the recording medium, the first clip stream file including video data representing at least one still image, the second clip stream file including audio data, the still image being reproduced as a slideshow, the audio data being reproduced with the slideshow, the playlist file including at least one playitem and at least one sub-playitem, the at least one playitem indicating an in-point and an out-point of the first clip stream file to reproduce the at least one still image and providing a display mode, the display mode indicating to display the at least one still image for a finite period of time if the at least one still image is to be displayed for a finite period of time, the display mode indicating to display the at least one still image for an infinite period of time if the at least one still image is to be displayed for an infinite period of time, the at least one sub-playitem indicating an in-point and an out-point of the second clip stream file to reproduce the audio data, wherein the at least one playitem further includes duration information indicating a length of time to display the at least one still image when the display mode indicates to display the at least one still image for a finite period of time, and wherein the data base area includes first mapping information between a presentation time and a unit of the first clip stream file and second mapping information between a presentation time and a unit of the second clip stream file, and the first mapping information includes at least one entry point, every still image in the first clip stream file being pointed to by an entry point, wherein coding information in the data base area indicates coding format of at least one of the first clip stream file and the second clip stream file.

24. The apparatus of claim 23, wherein the at least one sub-playitem includes indicator indicating the at least one playitem related to the at least one sub-playitem such that the audio data is played in association with the at least one still image.

25. The apparatus of claim 23, wherein the data base area includes a clip information area storing first and second clip information, the first clip information file being associated with the first clip stream file, the second clip information file being associated with the second clip stream file.

26. The apparatus of claim 25, wherein the still images in the first clip stream file are divided into at least one still image unit, the first clip information file including start number information indicating image number of a start still image among the still images included in the corresponding still image unit, and total number information indicating a total number of the still images included in the corresponding still image unit, and size information indicating a size of each still image included in the corresponding still image unit.

27. The apparatus of claim 23, wherein the recording medium is a read-only recording medium.

28. The apparatus of claim 23, the recording medium is a recordable recording medium.

29. The apparatus of claim 23, wherein the at least one still image is selected from the video data.

* * * * *